United States Patent
Deng et al.

(10) Patent No.: US 9,942,790 B2
(45) Date of Patent: Apr. 10, 2018

(54) METHOD AND DEVICE FOR REDUCING NUMBER OF ACCESS TIMES OF MULTIMODE TERMINAL

(71) Applicant: ZTE CORPORATION, Shenzhen, Guangdong Province (CN)

(72) Inventors: Chao Deng, Shenzhen (CN); Qilin Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 6 days.

(21) Appl. No.: 15/102,532

(22) PCT Filed: Jun. 30, 2014

(86) PCT No.: PCT/CN2014/081318
§ 371 (c)(1),
(2) Date: Jun. 8, 2016

(87) PCT Pub. No.: WO2015/090033
PCT Pub. Date: Jun. 25, 2015

(65) Prior Publication Data
US 2016/0316387 A1    Oct. 27, 2016

(30) Foreign Application Priority Data

Dec. 17, 2013    (CN) .......................... 2013 1 0693521

(51) Int. Cl.
*H04W 28/00* (2009.01)
*H04W 28/02* (2009.01)
(Continued)

(52) U.S. Cl.
CPC ......... *H04W 28/0215* (2013.01); *H04L 67/16* (2013.01); *H04W 28/0236* (2013.01);
(Continued)

(58) Field of Classification Search
CPC .............. H04L 67/16; H04W 28/0215; H04W 28/0236; H04W 36/0083; H04W 36/30;
(Continued)

(56) References Cited

U.S. PATENT DOCUMENTS

| 8,537,193 B1 | 9/2013 | Habib et al. |
| 2007/0250709 A1 | 10/2007 | Bailey, Jr. |

(Continued)

FOREIGN PATENT DOCUMENTS

| CN | 1794681 A | 6/2006 |
| CN | 103096403 A | 5/2013 |
| WO | 2013127154 A1 | 9/2013 |

*Primary Examiner* — Mohamed Kamara
(74) *Attorney, Agent, or Firm* — Ling Wu; Stephen Yang; Ling and Yang Intellectual Property

(57) ABSTRACT

The present document discloses a method for reducing a number of access times of a multimode terminal. The method includes the following steps: judging a network state of the terminal; acquiring signal intensity of a base station, calculating network delay time according to the signal intensity of the base station, and setting a timer according to the network delay time; and switching a data service when the timer has timed out. The present document further discloses an apparatus for reducing a number of access times of a multimode terminal.

10 Claims, 2 Drawing Sheets

(51) Int. Cl.
    *H04W 36/00*     (2009.01)
    *H04L 29/08*     (2006.01)
    *H04W 48/18*     (2009.01)
    *H04W 36/30*     (2009.01)
    *H04W 88/06*     (2009.01)

(52) U.S. Cl.
    CPC ....... *H04W 36/0083* (2013.01); *H04W 48/18* (2013.01); *H04W 36/30* (2013.01); *H04W 88/06* (2013.01)

(58) Field of Classification Search
    CPC ... H04W 48/18; H04W 88/06; H04W 76/002; H04W 76/005; H04W 76/02; H04W 76/04; H04W 76/06
    See application file for complete search history.

(56) References Cited

U.S. PATENT DOCUMENTS

| | | | |
|---|---|---|---|
| 2008/0220784 A1 | 9/2008 | Somasundaram et al. | |
| 2009/0034547 A1* | 2/2009 | Choi | H04L 1/188 370/410 |
| 2012/0196644 A1* | 8/2012 | Scherzer | H04W 72/02 455/524 |
| 2012/0315905 A1* | 12/2012 | Zhu | H04W 36/36 455/436 |
| 2013/0121145 A1* | 5/2013 | Draznin | H04L 12/5692 370/230 |
| 2014/0011499 A1* | 1/2014 | He | H04W 36/32 455/436 |
| 2015/0146684 A1* | 5/2015 | Yang | H04W 52/146 370/331 |

* cited by examiner

METHOD AND DEVICE FOR REDUCING NUMBER OF ACCESS TIMES OF MULTIMODE TERMINAL

TECHNICAL FIELD

The present document relates to the field of mobile communication, and in particular, to a method and apparatus for reducing a number of access times of a multimode terminal.

BACKGROUND OF THE RELATED ART

Currently, mobile networks develop rapidly, and the fourth-generation communication technologies such as Long Term Evolution (LTE) have been deployed. Together with the existing 2G and 3G networks, the current networks have multiple network modes such as cdma1x/gsm (2G), cdma evdo/wcdma (3G), LTE (4G), etc. For mobile phone terminals, the above multiple network modes can be supported simultaneously in terms of hardware and software. However, due to network coverage, network distributions are different in different areas, and there is a problem that mobile phone switches among multiple modes. The traditional switch ways have problems of a large number of access times and a low access success rate, which are primarily reflected in the following three aspects.

1. The 3G/4G network is lost instantaneously and can be recovered rapidly for example due to shielding of a high building and a tunnel. If a data connection falls back to the 1× low-speed network immediately, a period of time is needed before the data connection can return back to the 3G/4G high-speed network, which influences user experience.

2. A new 3G/4G network is found, but the network signal is unstable. If a data connection is initiated immediately, as a result, a large of access failures may occur, and transmission power is continuously increased, which influences the standby of mobile phones and increases radiation.

3. The network coverage is not good, and there are frequent switches between the 3G/4G network and the 2G network, which results in generation of ping-pong effects, and influences the standby and performance of mobile phones.

SUMMARY

In order to solve the existing technical problem, the embodiments of the present document provide a method and apparatus for reducing a number of access times of a multimode terminal.

The embodiments of the present document provide a method for reducing a number of access times of a multimode terminal, comprising the following steps:

judging a network state of the terminal;

acquiring signal intensity of a base station, calculating network delay time according to the signal intensity of the base station, and setting a timer according to the network delay time; and switching a data service when the timer has timed out.

Wherein, the network state comprises a service loss state and a service acquisition state.

Wherein, the process of calculating network delay time comprises:

when the terminal is in the service loss state, the network delay time is a product of signal intensity of a base station of a low-speed network and a delay coefficient; and when the terminal is in the service acquisition state, the network delay time is a product of signal intensity of a base station of a high-speed network and a delay coefficient.

Wherein, the process of switching a data service comprises:

when the terminal is in the service loss state and the timer has timed out, judging whether there is a service of the high-speed network, and when there is no service of the high-speed network, switching the data service to the low-speed network; and when the terminal is in the service acquisition state and the timer has timed out, judging whether there is a service of the high-speed network, and when there is a service of the high-speed network, switching the data service to the high-speed network.

Wherein, the signal intensity of the base station comprises a power signal and an ecio signal.

Wherein, the delay coefficient is −0.25.

Wherein, judging a network state of the terminal comprises:

sampling the signal intensity rssi of the current high-speed network at a fixed sampling interval T_do_div, and when the sampled rssi is less than a preset minimum threshold R_do_low for the signal intensity of the high-speed network, starting a low value timer T_do_low; and when rssi≥R_do_low, stopping the T_do_low;

recording the delay time T, wherein $$T = \begin{cases} 5, & (\text{T\_do\_low} < 5) \\ \text{T\_do\_low}, & (5 \leq \text{T\_do\_low} \leq 30) \\ 30, & (\text{T\_do\_low} > 30) \end{cases};$$

when the service is lost, starting a service loss timer T_do_oos instead of reporting the service loss state, and when the service is recovered, stopping the T_do_oos; and when the time recorded by the T_do_oos reaches the delay time T, reporting the service loss state and judging that the network state of the terminal is the service loss state.

The embodiments of the present document further provide an apparatus for reducing a number of access times of a multimode terminal, comprising:

a network state judgment unit configured to judge a network state of the terminal;

a timer setting unit configured to acquire signal intensity of a base station, calculate network delay time according to the signal intensity of the base station, and set a timer according to the network delay time; and a data service switching unit configured to switch a data service when the timer has timed out.

Wherein, the network state comprises a service loss state and a service acquisition state.

Wherein, the timer setting unit comprises a network delay time calculation sub-unit configured to calculate the network delay time as a product of signal intensity of a base station of a low-speed network and a delay coefficient when the terminal is in the service loss state; and calculate the network delay time as a product of signal intensity of a base station of a high-speed network and a delay coefficient when the terminal is in the service acquisition state.

Wherein, the data service switching unit comprises:

a judgement switching sub-unit configured to judge whether there is a service of the high-speed network when the terminal is in the service loss state and the timer has timed out, and switch the data service to the low-speed network when there is no service of the high-speed network;

and judge whether there is a service of the high-speed network when the terminal is in the service acquisition state and the timer has timed out, and switch the data service to the high-speed network when there is a service of the high-speed network.

Wherein, the signal intensity of the base station comprises a power signal and an ecio signal.

Wherein, the delay coefficient is −0.25.

Wherein, the network state judgment unit comprises:

a signal intensity sampling sub-unit configured to sample the signal intensity rssi of the current high-speed network at a fixed sampling interval T_do_div;

a low value timer configured to start a low value timer T_do_low when the rssi sampled by the signal intensity sampling sub-unit is less than a preset minimum threshold R_do_low for the signal intensity of the high-speed network, and stop the T_do_low when rssi≥R_do_low;

a delay time recording sub-unit configured to record the delay time T, wherein $$T = \begin{cases} 5, & (\text{T\_do\_low} < 5) \\ \text{T\_do\_low}, & (5 \le \text{T\_do\_low} \le 30) \\ 30, & (\text{T\_do\_low} > 30) \end{cases};$$

a service loss timer configured to start a service loss timer T_do_oos when the service is lost and stop the T_do_oos when the service is recovered; and a service loss state reporting sub-unit configured to report the service loss state when the time recorded by the T_do_oos reaches the delay time T.

Beneficial effects of the embodiments of the present document are as follows:

the embodiments of the present document use signal intensity of a base station demodulated by a mobile phone as a factor, calculate a time delay and add the time delay when switching between network modes, which can effectively reduce a number of access times and enhance an access success rate, thereby ensuring that the mobile phone can use a high-speed network as much as possible.

SPECIFIED EMBODIMENTS

In order to solve the problem in the existing art that there is a large number of access times and a low access success rate when a multimode terminal switches between multiple modes, the embodiments of the present document provide a method and apparatus for reducing a number of access times of the multimode terminal. The present document will be further described in detail below in conjunction with accompanying drawings and five embodiments. It should be understood that the specific embodiments described here are merely used to explain the present document instead of limiting the present document.

EMBODIMENT ONE

Figure 1:
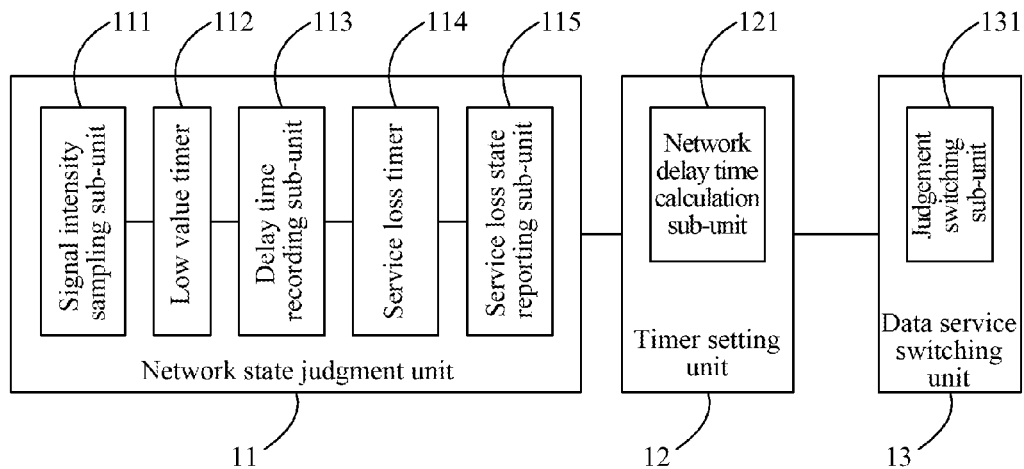
FIG. 1 is a structural diagram of an apparatus for reducing a number of access times of a multimode terminal according to an embodiment of the present document.
Figure 2:
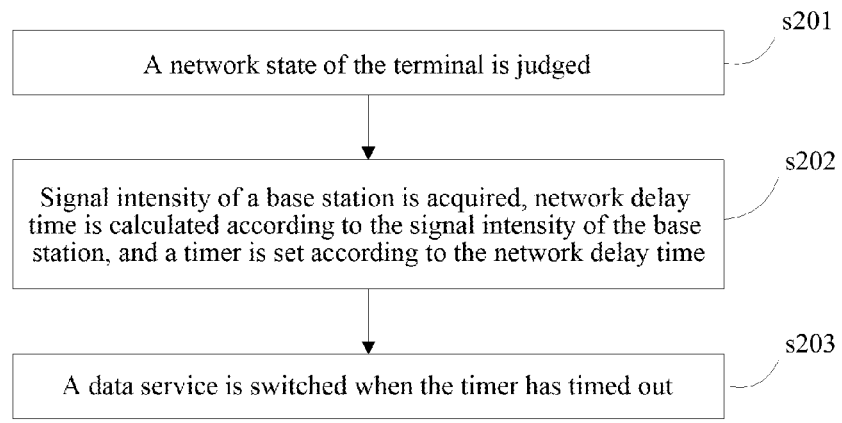
FIG. 2 is a flowchart of a method for reducing a number of access times of a multimode terminal according to an embodiment of the present document.

An apparatus for reducing a number of access times of a multimode terminal according to the embodiment of the present document is shown in FIG. 1. The apparatus comprises a network state judgment unit 11, a timer setting unit 12, and a data service switching unit 13, wherein the timer setting unit 12 is connected to the network state judgement unit 11 and the data service switching unit 13 respectively.

The network state judgment unit 11 is configured to judge a network state of the terminal, wherein the network state comprises a service loss state and a service acquisition state.

The timer setting unit 12 is configured to acquire signal intensity of a base station, calculate network delay time according to the signal intensity of the base station, and set a timer according to the network delay time.

The data service switching unit 13 is configured to switch a data service when the timer has timed out.

The network state judgment unit 11 comprises a signal intensity sampling sub-unit 111, a low value timer 112, a delay time recording sub-unit 113, a service loss timer 114 and a service loss state reporting sub-unit 115; wherein the low value timer 112 is connected to the signal intensity sampling sub-unit 111 and the delay time recording sub-unit 113 respectively, and the service loss timer 114 is connected to the delay time recording sub-unit 113 and the service loss state reporting sub-unit 115 respectively.

The signal intensity sampling sub-unit 111 is configured to sample signal intensity rssi of a current high-speed network at a fixed sampling interval T_do_div;

the low value timer 112 is configured to start a low value timer T_do_low when the rssi sampled by the signal intensity sampling sub-unit 111 is less than a preset minimum threshold R_do_low for the signal intensity of the high-speed network, and stop the T_do_low when rssi≥R_do_low;

the delay time recording sub-unit 113 is configured to record the delay time T, wherein $$T = \begin{cases} 5, & (\text{T\_do\_low} < 5) \\ \text{T\_do\_low}, & (5 \le \text{T\_do\_low} \le 30) \\ 30, & (\text{T\_do\_low} > 30) \end{cases};$$

the service loss timer 114 is configured to start a service loss timer T_do_oos when the service is lost and stop the T_do_oos when the service is recovered; and the service loss state reporting sub-unit 115 is configured to report the service loss state when the time recorded by the T_do_oos reaches the delay time T.

The timer setting unit 12 comprises a network delay time calculation sub-unit 121, configured to calculate the network delay time as a product of signal intensity of a base station of a low-speed network and a delay coefficient when the terminal is in the service loss state; and calculate the network delay time as a product of signal intensity of a base station of a high-speed network and a delay coefficient when the terminal is in the service acquisition state. In the present embodiment, the signal intensity of the base station comprises a power signal and an ecio signal, and the delay coefficient is −0.25.

The data service switching unit 13 comprises a judgement switching sub-unit 131 configured to judge whether there is a service of the high-speed network when the terminal is in the service loss state and the timer has timed out, and switch the data service to the low-speed network when there is no service of the high-speed network; and judge whether there is a service of the high-speed network when the terminal is in the service acquisition state and the timer has timed out, and switch the data service to the high-speed network when there is a service of the high-speed network.

It should be illustrated that the network state judgment unit 11, the timer setting unit 12, and the data service switching unit 13, the signal intensity sampling sub-unit 111, the low value timer 112, the delay time recording sub-unit 113, the service loss timer 114 and the service loss state reporting sub-unit 115, as well as the network delay time calculation sub-unit 121 and the judgement switching sub-unit 131 described above may be implemented by a Central Processing Unit (CPU), a Micro Processing Unit (MPU), a Digital Signal Processor (DSP) or a Field-Programmable Gate Array (FPGA) of the apparatus according to the above embodiment.

EMBODIMENT TWO

The present embodiment proposes a method for reducing a number of access times based on a quality of a network environment. The method adds the time delay when switching between network modes using signal intensity (power and ecio) of a base station demodulated by a mobile phone as a factor, which reduces a number of access times. In the present embodiment, firstly a network state is judged, wherein the network state comprises service loss (OOS) and service acquisition (ACQ). Then, signal intensity (power and ecio) of a base station is received, on the basis of the signal intensity being as a time factor network delay time is calculated and a timer is set. Finally, a data service is switched in the OOS and ACQ states when the timer has timed out.

When using the apparatus for reducing a number of access times of a multimode terminal according to the embodiment one, a method for reducing a number of access times of a multimode terminal according to the embodiment of the present document comprises the following steps.

In step s201, a network state of the terminal is judged, wherein the network state comprises a service loss state and a service acquisition state.

In the present embodiment, when the terminal currently accesses a high-speed network, judging a network state of the terminal comprises:

signal intensity rssi of the current high-speed network is sampled at a fixed sampling interval T_do_div, when the sampled rssi is less than a preset minimum threshold R_do_low for the signal intensity of the high-speed network, a low value timer T_do_low is started, and when rssi≥R_do_low, the T_do_low is stopped; delay time T is recorded, wherein $$T = \begin{cases} 5, & (T\_do\_low < 5) \\ T\_do\_low, & (5 \le T\_do\_low \le 30) \\ 30, & (T\_do\_low > 30) \end{cases};$$

when the service is lost, a service loss timer T_do_oos is started instead of reporting the service loss state, and when the service is recovered, the T_do_oos is stopped; and when the time recorded by the T_do_oos reaches the delay time T, the service loss state is reported and it is to judge that the network state of the terminal is the service loss state.

In step s202, signal intensity of a base station is acquired, network delay time is calculated according to the signal intensity of the base station, and a timer is set according to the network delay time.

In the present embodiment, the process of calculating network delay time comprises: when the terminal is in the service loss state, the network delay time is a product of signal intensity of a base station of a low-speed network and a delay coefficient; and when the terminal is in the service acquisition state, the network delay time is a product of signal intensity of a base station of a high-speed network and a delay coefficient. In the present embodiment, the signal intensity of the base station comprises a power signal and an ecio signal, and the delay coefficient is −0.25.

In step s203, a data service is switched when the timer has timed out. In the present embodiment, when the terminal is in the service loss state and the timer has timed out, it is to judge whether there is a service of the high-speed network, and when there is no service of the high-speed network, the data service is switches to the low-speed network; and when the terminal is in the service acquisition state and the timer has timed out, it is to judge whether there is a service of the high-speed network, and when there is a service of the high-speed network, the data service is switched to the high-speed network.

EMBODIMENT THREE

Figure 3:
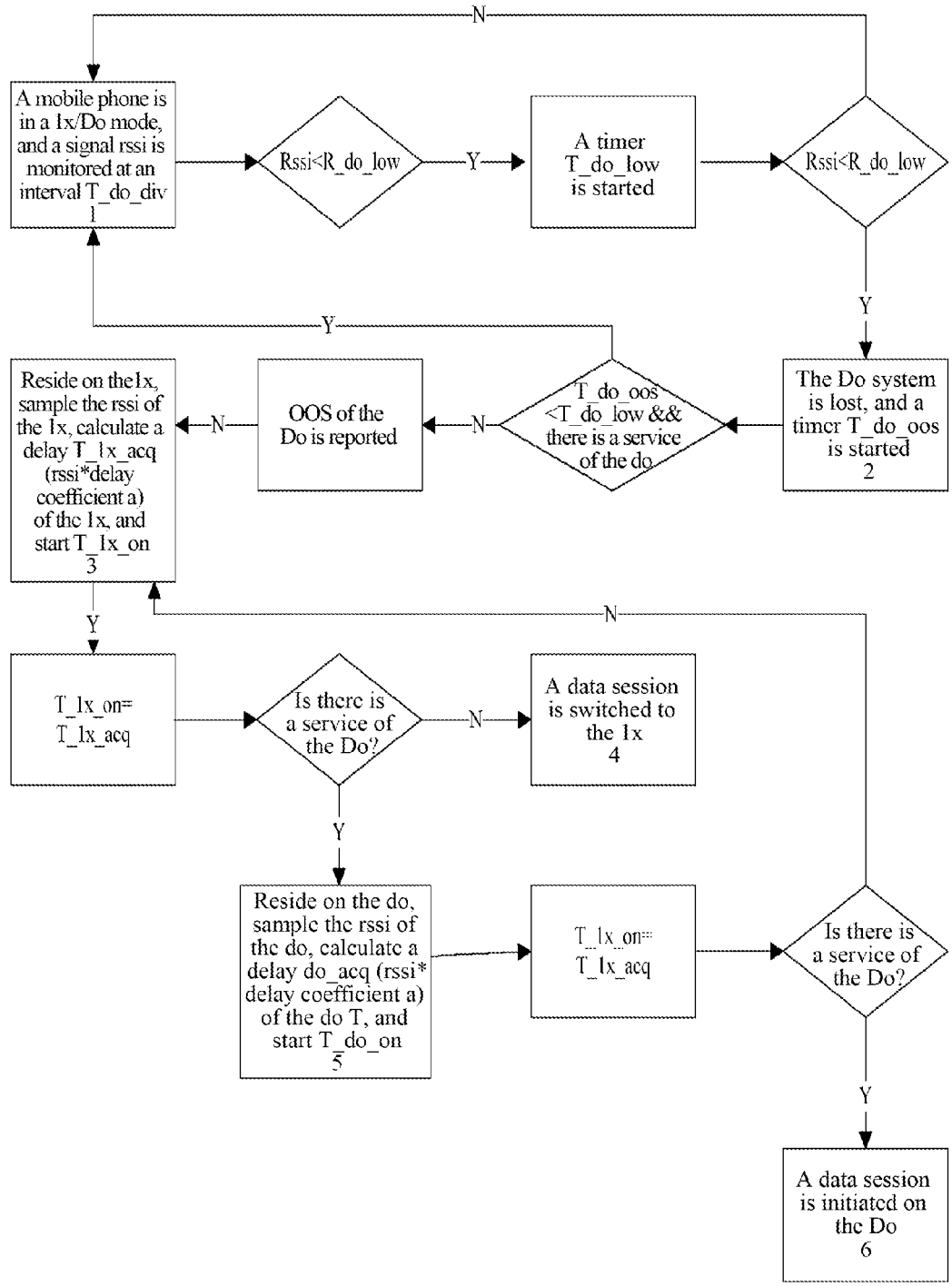
FIG. 3 is a flowchart of a specific implementation of a method for reducing a number of access times of a multimode terminal according to an embodiment of the present document.

The embodiment of the present document places emphasis on calculating time delay through a quality of a network environment, to decide time delay initiated by a data service when a network for a mobile phone changes. Compared with the traditional manners, the present embodiment can effectively reduce a number of access times and improve an access success rate. A specific implementation of a method for reducing a time of access times of a multimode terminal according to the embodiment of the present document is shown in FIG. 3, and comprises the following processes:

The present embodiment is described by taking a mobile phone with a cdma/evdo/lte mixed mode as an example. For an existing mobile phone, EVDO and LTE do not exist at the same time, but cdma and evdo/lte can coexist, and the mobile phone always tries to initiate a service on a high-speed 3g/4g network as much as possible.

A mobile phone is registered on cdma+ evdo/cdma+ lte by default when the mobile phone is started. With reference to FIG. 3, a specific flow of the present embodiment comprises:

1. By taking cdma/evdo as an example, after the mobile phone is started, the mobile phone is in state 1 (a cdma/evdo mixed state). In the present embodiment, signal intensity of a current Do network is sampled at a fixed interval (T_do_div 10S), and when it is found that rssi(power+ ecio)<R_do_low(−100 dB), a timer T_do_low is started, as state 2. If rssi>-R_do_low after a period of time T_do_div, the T_do_low is stopped. At the moment of a system losses OOS, a time factor of the T_do_low is recorded (a range of the T_do_low is set as 5S-30S in the present embodiment), and if the range is exceeded, 5 s and 30 s are taken respectively. At this time, a timer T_do_oos is started instead of reporting the OOS, when the service is recovered, the T_do_oos is stopped, and only when T_do_oos=T_do_low, the OOS is reported. In this way, in a case that the 3G/4G network is lost instantaneously and can be recovered rapidly, for example, in a complex case that the mobile phone is in a tunnel or at a coverage edge of a network, switching of a data service may not occur, so that the data service is still in the high-speed network.

2. When the EVDO reports the OOS, as state 3, the mobile phone is in a single CDMA1x mode. At this time, a Data Session is not immediately initiated on the 1x in the present embodiment. Instead, in the present embodiment, rssi of the current 1x is sampled as a time factor to obtain a delay T_1x_acq (which is rssi*delay coefficient a), and a timer T_1x_on is started at the same time. Assuming that the sampled rssi=−80 dB, in the present embodiment, the rssi is multiplied with the delay coefficient a (−0.25). After delay of rssi*a (20S), if it is found that the Do is still in the OOS state, the Data Session is initiated on the 1x, as state 4, in this way, after residence on the 1x for a period of time, an access success rate on the 1x can be ensured. At the same time, if there is a service of the Do, no Data Session is initiated on the 1x in the present embodiment. Instead, the Data Session is initiated on the Do after delay of a certain period of time (step 3), which avoids switching between the networks again, thereby ensuring that the mobile phone can use the high-speed network as much as possible.

3. If there is a service of the Do, as state 5, a Data Session is not immediately initiated on the Do in the present embodiment. Instead, in the present embodiment, rssi of the current Do is sampled as a time factor to obtain a delay T_do_acq (which is rssi*delay coefficient a), and a timer T_do_on is started at the same time. Assuming that the sampled rssi=−80 dB, in the present embodiment, the rssi is multiplied with the delay coefficient s (−0.25). After delay of rssi*a (20S), if it is found that the Do is in the OOS state at this time, the Data Session is not switched to the Do, which avoids an access failure on the Do. At the same time, if there is a service of the Do, a Data Session is initiated on the Do in the present embodiment, as state 6, after residence on the Do for a period of time, it is to ensure an access success rate of the mobile phone, thereby ensuring that the mobile phone can use the high-speed network as much as possible.

The embodiments of the present document relate to conditions where a multimode intelligent mobile phone can initiate a data service connection in different network modes, which is suitable for an Android, IOS and WP multi-platform. The embodiments of the present document calculate a time delay and add the time delay when switching between network modes using signal intensity of a base station demodulated by the mobile phone as a factor, which can effectively reduce a number of access times and enhance an access success rate, thereby ensuring that the mobile phone can use a high-speed network as much as possible.

Although preferable embodiments of the present document have been disclosed for illustration purpose, those skilled in the art will appreciate that various improvements, additions and substitutions are also possible. Therefore, the scope of the present document is not limited to the above embodiments.

INDUSTRIAL APPLICABILITY

The embodiments of the present document use signal intensity of a base station demodulated by a mobile phone as a factor, calculate a time delay and add the time delay when switching between network modes, which can effectively reduce a number of access times and enhance an access success rate, thereby ensuring that the mobile phone can use a high-speed network as much as possible.

What is claimed is:

1. A method for reducing a number of access times of a multimode terminal, comprising the following steps:
   judging a network state of the terminal;
   acquiring signal intensity of a base station, calculating network delay time according to the signal intensity of the base station, and setting a timer according to the network delay time; and
   switching a data service when the timer has timed out
   wherein the network state comprises a service loss state and a service acquisition state; wherein the process of calculating network delay time comprises:
   when the terminal is in the service loss state, the network delay time is a product of signal intensity of a base station of a low-speed network and a delay coefficient and
   when the terminal is in the service acquisition state, the network delay time is a product of signal intensity of a base station of a high-speed network and a delay coefficient.

2. The method for reducing a number of access times of a multimode terminal according to claim 1, wherein the process of switching a data service comprises:
   when the terminal is in the service loss state and the timer has timed out, judging whether there is a service of the high-speed network, and when there is no service of the high-speed network, switching the data service to the low-speed network; and
   when the terminal is in the service acquisition state and the timer has timed out, judging whether there is a service of the high-speed network, and when there is a service of the high-speed network, switching the data service to the high-speed network.

3. The method for reducing a number of access times of a multimode terminal according to claim 1, wherein the signal intensity of the base station comprises a power signal and an ecio signal.

4. The method for reducing a number of access times of a multimode terminal according to claim 1, wherein the delay coefficient is −0.25.

5. The method for reducing a number of access times of a multimode terminal according to claim 1, wherein judging a network state of the terminal comprises:
   sampling the signal intensity rssi of the current high-speed network at a fixed sampling interval T_do_div, and when the sampled rssi is less than a preset minimum threshold R_do_low for the signal intensity of the high-speed network, starting a low value timer T_do_low; and when rssi≥R_do_low, stopping the T_do_low;
   recording the delay time T, wherein $$T = \begin{cases} 5, & (T\_do\_low < 5) \\ T\_do\_low, & (5 \leq T\_do\_low \leq 30) \\ 30, & (T\_do\_low > 30) \end{cases};$$

when the service is lost, starting a service loss timer T_do_oos instead of reporting the service loss state, and when the service is recovered, stopping the T_do_oos; and
   when the time recorded by the T_do_oos reaches the delay time T, reporting the service loss state and judging that the network state of the terminal is the service loss state.

6. An apparatus for reducing a number of access times of a multimode terminal, comprising hardware for performing instructions in a computer-readable storage medium which executes steps in following units:
- a network state judgment unit configured to judge a network state of the terminal;
- a timer setting unit configured to acquire signal intensity of a base station, calculate network delay time according to the signal intensity of the base station, and set a timer according to the network delay time; and
- a data service switching unit configured to switch a data service when the timer has timed out;
- wherein the network state comprises a service loss state and a service acquisition state; wherein the timer setting unit comprises a network delay time calculation sub-unit configured to calculate the network delay time as a product of signal intensity of a base station of a low-speed network and a delay coefficient when the terminal is in the service loss state; and calculate the network delay time as a product of signal intensity of a base station of a high-speed network and a delay coefficient when the terminal is in the service acquisition state.

7. The apparatus for reducing a number of access times of a multimode terminal according to claim 6, wherein the data service switching unit comprises hardware for performing instructions in a computer-readable storage medium which executes steps in following unit:
- a judgement switching sub-unit configured to judge whether there is a service of the high-speed network when the terminal is in the service loss state and the timer has timed out, and switch the data service to the low-speed network when there is no service of the high-speed network; and judge whether there is a service of the high-speed network when the terminal is in the service acquisition state and the timer has timed out, and switch the data service to the high-speed network when there is a service of the high-speed network.

8. The apparatus for reducing a number of access times of a multimode terminal according to claim 6, wherein the signal intensity of the base station comprises a power signal and an ecio signal.

9. The apparatus for reducing a number of access times of a multimode terminal according to claim 6, wherein the delay coefficient is −0.25.

10. The apparatus for reducing a number of access times of a multimode terminal according to claim 6, wherein the network state judgment unit comprises hardware for performing instructions in a computer-readable storage medium which executes steps in following units:
- a signal intensity sampling sub-unit configured to sample the signal intensity rssi of the current high-speed network at a fixed sampling interval T_do_div;
- a low value timer configured to start a low value timer T_do_low when the rssi sampled by the signal intensity sampling sub-unit is less than a preset minimum threshold R_do_low for the signal intensity of the high-speed network, and stop the T_do_low when rssi≥R_do_low;
- a delay time recording sub-unit configured to record the delay time T, wherein $$T = \begin{cases} 5, & (T\_do\_low < 5) \\ T\_do\_low, & (5 \leq T\_do\_low \leq 30) \\ 30, & (T\_do\_low > 30) \end{cases};$$

- a service loss timer configured to start a service loss timer T_do_oos when the service is lost and stop the T_do_oos when the service is recovered; and
- a service loss state reporting sub-unit configured to report the service loss state when the time recorded by the T_do_oos reached the delay time T.

* * * * *